Dec. 5, 1939. PETER-FRANZ G. B. VON OBERSTADT 2,182,034
SHOCK ABSORBER
Filed June 26, 1937
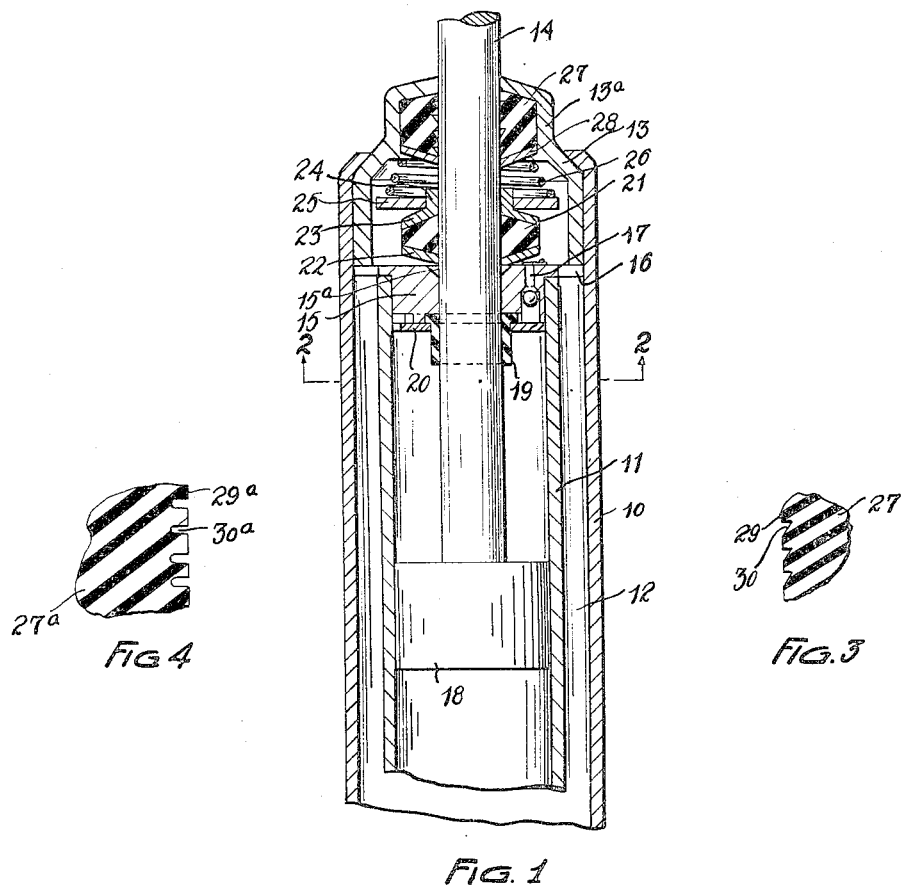
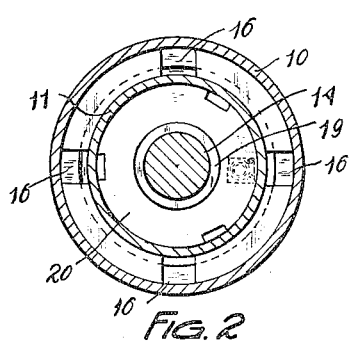
INVENTOR.
PETER-FRANZ GRAF BOPP. VON OBERSTADT
BY
Kwis Hudson & Kent
ATTORNEYS Patented Dec. 5, 1939

2,182,034

UNITED STATES PATENT OFFICE 2,182,034

SHOCK ABSORBER

Peter-Franz Graf Bopp von Oberstadt, Cleveland, Ohio, now by judicial change of name Peter Bopp Oberstadt Application June 26, 1937, Serial No. 150,598
In Germany December 22, 1936

3 Claims. (Cl. 188—88)

This invention relates to a rod packing, and particularly to a packing for a reciprocating rod such as is employed for example in a direct acting hydraulic shock absorber. Inasmuch as the subject matter of the present invention has particular utility when used to pack the reciprocating piston rod of a direct acting hydraulic shock absorber to prevent the escape of fluid or oil from the shock absorber, the invention will be described and illustrated herein as employed in that relationship.

An object of the invention is to provide an improved packing for a reciprocating rod which efficiently prevents fluid, such as oil, working along the rod to the outer side of the packing.

Another object is to provide improved packing for a reciprocating rod and which engages the rod under tension and wherein means is provided for compensating for loss of tension in the packing, which might occur from wear or other causes, to thus maintain the desired constant tension in the engagement of the rod by the packing.

A further object is to provide a packing for a reciprocating rod and which is of such character as to have a minimum friction effect upon the rod and a maximum sealing and wiping effect thereon to prevent fluid such as oil working along the rod beyond the packing.

A still further object is to provide in a hydraulic direct acting shock absorber a packing for the piston rod thereof which is of such character as to prevent the escape of fluid such as oil to the exterior of the shock absorber and to effect a recuperation of the fluid which works along the rod toward the exterior of the shock absorber.

A still different object of the invention is to provide a shock absorber and particularly a shock absorber of the direct double acting type which will be quiet in operation.

A further object is to provide in a shock absorber of the direct acting type means for effectively sealing the pressure chamber at the point where the piston rod extends through an end thereof against the escape of air and oil and which means will not become loose or ineffective due to looseness occasioned by wear between the parts.

Further and additional objects and advantages not hereinbefore specified will become apparent hereinafter during the detailed description of an embodiment of the invention which is illustrated in the accompanying drawing wherein, Fig. 1 is a fragmentary longitudinal sectional view through a direct acting hydraulic shock absorber, the packing of the invention being illustrated as employed for packing the reciprocating piston rod of the shock absorber.

Fig. 2 is a transverse sectional view taken substantially on line 2—2 of Fig. 1 looking in the direction of the arrows.

Fig. 3 is a fragmentary detailed sectional view of a portion of one of the gaskets used in the packing.

Fig. 4 is a view similar to Fig. 3 but illustrating a different form of gasket.

Referring to Figs. 1 and 2, the direct acting hydraulic shock absorber shown therein comprises an outer casing or housing 10 in which is arranged in spaced concentric relationship a pressure cylinder 11, the annular space 12 between the casing 10 and cylinder 11 forming a reservoir, as will be well understood in the art. The upper end of the casing or housing is closed by a closure member 13 having a reduced portion extending outwardly of the casing or housing, as indicated at 13a. The portion 13a is provided with a central opening through which the piston rod 14 extends, while a gasket forming part of the packing of the present invention is housed within the extended portion 13a and will later be referred to. The upper end of the cylinder 11 is closed by a plug member 15 which has an annular flange extending outwardly over the upper end of the cylinder and contacting with the interior wall of the casing or housing 10, such flange engaging the inner end of the closure member 13. This flange of the plug 15 is provided with a plurality of openings 16, wherefore the interior of the closure member 13 is in communication with the reservoir 12. The plug member 15 is provided with air venting means, indicated generally at 17, and of the character shown in my copending application Serial No. 124,639, filed February 8, 1937, now Patent No. 2,155,978, issued April 25, 1939, but since this air venting means forms no part per set of the present invention further reference thereto is unnecessary. The piston rod 14 extends through a central bore in the plug 15 and into the cylinder 11 and is operatively connected with the piston 18.

It will be understood that even though the clearance between the piston rod 14 and the central bore of the plug 15 is very small that some of the fluid in the shock absorber which will be referred to as oil will remain on the rod as it moves inwardly and outwardly of the cylinder and thus be taken out of the cylinder or working chamber. Since the piston rod during the operation of the shock absorber acts some-what like a pump, the oil in the cylinder will eventually be carried outwardly by the rod until the cylinder is substantially empty, wherefore the braking action of the shock absorber would be ruined. It is necessary, therefore, that the amount of oil carried to the outside of the cylinder by the reciprocating movements of the piston rod be reduced to a minimum and that such oil as is carried to the outside be wiped off of the rod and recuperated, so that the shock absorber will always have the required supply of oil and thus will maintain its braking action at maximum efficiency.

An elastic sleeve 19 is arranged on the piston rod 14 interiorly of the cylinder and has a flanged end engaging in a recess on the inner side of the plug 15 and held in position by a plate 20. This elastic sleeve 19 tightly grips the piston rod 14 and acts as an initial means to prevent oil being carried by the rod outwardly of the cylinder through the bore in the plug 15. Heretofore in shock absorbers of the type described herein it has been customary to employ in the piston rod opening of the closure plug of the pressure cylinder a metal bushing that is very accurately machined and wherein reliance is placed on the close tolerances between the bushing and the piston rod to prevent the atomization of oil beyond the cylinder head. It has been found that shock absorbers employing bushings in the manner just stated function satisfactorily at first but subsequently, due to inevitable wear occurring in the bushings, these shock absorbers become noisy and oil is atomized through the clearance spaces between the bushings and the piston rods beyond the cylinder heads, whereupon a resultant hissing or sucking sound occurs during the operation of the shock absorbers, together with a consequent loss of oil around the piston rods at the upper ends of the shock absorbers. This hissing or sucking noise has been determined to result from the presence of uncontrolled air venting passages between the bushings and the piston rods which allow the oil in the working or pressure cylinders to be aspirated or atomized along with the included air past the cylinder heads and into the spaces above the cylinders. This atomization of the oil past the cylinder heads is particularly pronounced at times of accelerated recoil strokes and it was at such times that the hissing or sucking noises were most noticeable. There was also a resultant leakage of oil around the piston rods where they passed through the openings in the upper ends of the casings of the shock absorbers, inasmuch as the packings for the rods adjacent this location were subjected to oil pressures.

These disadvantages are overcome by the employment of the elastic sleeve 19 which tightly grips the piston rod at all times and is not subject to looseness due to wear as is the case where a metal bushing is employed as explained above. In the present construction there is no clearance between the rod and the elastic sleeve 19 providing uncontrolled air venting passages and, therefore, the oil will not be atomized or aspirated past the cylinder head through any uncontrolled air venting passages even during highly accelerated recoil strokes. Thus a shock absorber embodying the present invention will be quiet in operation.

It should also be observed that the elastic sleeve 19 exerts a wiping action upon the piston rod and thus further prevents oil from being carried by the rod beyond the cylinder head. Exteriorly of the cylinder and within the closure member 13 a gasket 21 is mounted on the rod and has its opposite ends of tapered or conical formation, the inner end of the gasket 21 carrying a similarly shaped plate 22 of hard material such as metal, while the outer end of the gasket 21 also carries a plate 23 of conical formation and provided with a central extension 24 through which the rod 14 extends. Mounted on the extension 24 of the plate 23 is a disc washer 25 forming an abutment for one end of a coil spring 26. Within the portion 13a of the closure member 13 there is mounted a gasket 27 provided with a central opening through which the rod 14 extends. The inner end of the gasket 27 is of tapered or conical formation and has a metal plate 28 lying in engagement therewith and forming the abutment for the outer end of the coil spring 26.

In order that the gaskets 21 and 27 function effectively to prevent oil being carried along the rod to the exterior of the shock absorber it is necessary that these gaskets grip the rod with a certain fixed tension. The tension with which these gaskets grip the rod may be obtained by having the openings in the gaskets through which the rod passes of smaller diameter than the rod. It has been found that the difference in diameter between the rod and the openings in the gaskets should be from 10 to 30% in order to provide a reliable wiping action upon the rod as, for example, if the rod is 12 mm. in diameter the diameter of the openings in the gaskets should be between 10.8 mm. and 8.4 mm. The tension with which the gasket 27 grips the rod may also be created by having the gasket of such external diameter that it must be forced into its position within the portion 13a of the closure member so as to compress the gasket and bring the opening therethrough into the proper size with respect to the diameter of the rod.

The gasket 27 may be said to be the main gasket while the gasket 21 can be called the auxiliary gasket. It will be readily understood that the gaskets in time will lose some of their tensile strength and that the openings, through wear, will also become enlarged, wherefore their gripping tension upon the rod is reduced. It is proposed to maintain this gripping tension of the gaskets upon the rod by the employment of the coil spring 26 which, acting against the tapered or conical ends of the gaskets, compresses the gaskets to maintain the gripping tension, even though the gaskets ordinarily would lose such gripping tension through loss of tensile strength or wear.

The auxiliary gasket 21 functions to wipe off a large amount of the oil carried out of the cylinder by the rod before such oil reaches the main gasket 27, and the oil which is wiped off by the auxiliary gasket 21 passes into a groove 15a formed in the outer side of the plug 15 and surrounding the rod, such groove in combination with the gasket 21 acting to form a chamber into which the oil wiped off the rod by the gasket can flow without being subjected to pressure, from whence it may be recuperated by flowing from the chamber through the opening 16 into the reservoir 12.

Inasmuch as oil is used in most hydraulic shock absorbers, it is proposed to employ gaskets formed of a material which will not be affected by the oil as would ordinary rubber, and which will have good resistance against the abrasive action of the reciprocating piston rod. Accordingly one or both of the gaskets 21 and 27 and the sleeve 17 should be formed of synthetic rubber or other compounds not affected by oil and yet possessing the necessary and desirable tensile strength to provide the required gripping tension upon the rod. As illustrative of the materials which may be used for the sleeve 17 and gaskets 21 and 27, in addition to rubber, it is contemplated to use synthetic materials commercially known as Duprene, Neoprene, or the like, or to use these materials in combination with rubber.

In order that one or both of the gaskets will have a maximum packing and wiping effect upon the rod with a minimum frictional effect thereon, it is proposed to form the openings in one or both of such gaskets with interrupted rod gripping surfaces having therebetween annular oil receiving and sealing spaces. For purposes of the present illustration only the gasket 27 has been illustrated with the opening therein thus formed, but it will be understood that the opening in the gasket 21 could be similarly formed.

Referring to Fig. 3 showing in section a portion of the gasket 27, it will be observed that the rod gripping surfaces of the opening of the gasket are indicated at 29 and that these surfaces are interrupted by the annular oil receiving and sealing spaces 30 arranged intermediate the gripping surfaces. In the present instance the gripping surfaces 30 are shown as substantially V-shaped spaces, and it will be observed that the edges formed by the junction of the upper side of the spaces with the under side of the gripping surfaces 29 provide ideal wiping edges for wiping the oil off of the piston rod.

In Fig. 4 a modified form of gasket is illustrated and is indicated by the numeral 27a, while the rod gripping surfaces of the opening in the gasket are indicated by the numeral 29a. The oil receiving and sealing spaces between the gripping surfaces 29a are indicated by the numeral 30a, and it will be seen that such spaces are in the form of grooves having parallel sides, as distinguished from the substantially V-shaped spaces 30 shown in Fig. 3. The action of the gasket 27a would be identical with the action of the gasket 27.

It will also be understood that oil receiving and sealing spaces which interrupt the rod gripping surfaces of the gasket could have other shapes than those shown in Figs. 3 and 4.

Although preferred embodiments of the invention have been illustrated and described herein it should be understood that the invention is susceptible of various modifications and adaptations within the scope of the appended claims.

Having thus described my invention what I claim is:

1. In a hydraulic direct acting shock absorber, an outer housing, a pressure cylinder arranged within said housing and having one of its ends terminating inwardly of an end of said housing to provide a chamber therebetween, a closure member for said end of said cylinder and having a central opening therethrough, a piston rod extending from the exterior of said housing through said chamber and opening into the interior of said cylinder, a piston adapted to be actuated by said rod for subjecting fluid in the cylinder to pressure, and a contractible sleeve projecting into said cylinder and pressure fluid and surrounding and tenaciously gripping said rod and carried by the inner side of said closure member.

2. In a hydraulic direct acting shock absorber, an outer housing, a pressure cylinder arranged therein and terminating short of an end thereof to provide a chamber between said end and an end of the cylinder, a closure member for said end of the cylinder and having a central opening therein, a piston rod extending from the exterior of said housing through said chamber and opening into the interior of said cylinder, a piston adapted to be actuated by said rod for subjecting fluid in the cylinder to pressure, an elastic sleeve projecting into said cylinder and pressure fluid and carried by said closure member and mounted on said rod and tightly gripping the same, spaced packing gaskets mounted on said rod in said chamber, and means for imposing a spring load upon said packing gaskets to maintain the same under compression wherefore their gripping tension upon the rod is maintained constant, the outer of said gaskets being provided with rod gripping surfaces interrupted by oil receiving and sealing spaces.

3. In a hydraulic direct acting shock absorber, an outer housing, a pressure cylinder arranged therein and terminating short of an end thereof to provide a chamber between said end and an end of the cylinder, a closure member for said end of the cylinder and having a central opening therein, a piston rod extending from the exterior of said housing through said chamber and opening into the interior of said cylinder, a piston adapted to be actuated by said rod for subjecting the fluid in the cylinder to pressure, an elastic sleeve projecting into said cylinder and pressure fluid and carried by said closure member and mounted on said rod and tightly gripping the same, spaced packing gaskets mounted on said rod in said chamber, and means for imposing a spring load upon said packing gaskets to maintain the same under compression wherefore their gripping tension upon the load is maintained constant.

PETER-FRANZ GRAF
BOPP von OBERSTADT.